(No Model.)
F. B. EASTMAN.
WATER FEEDING DEVICE FOR BOILERS.
No. 364,636. Patented June 14, 1887.
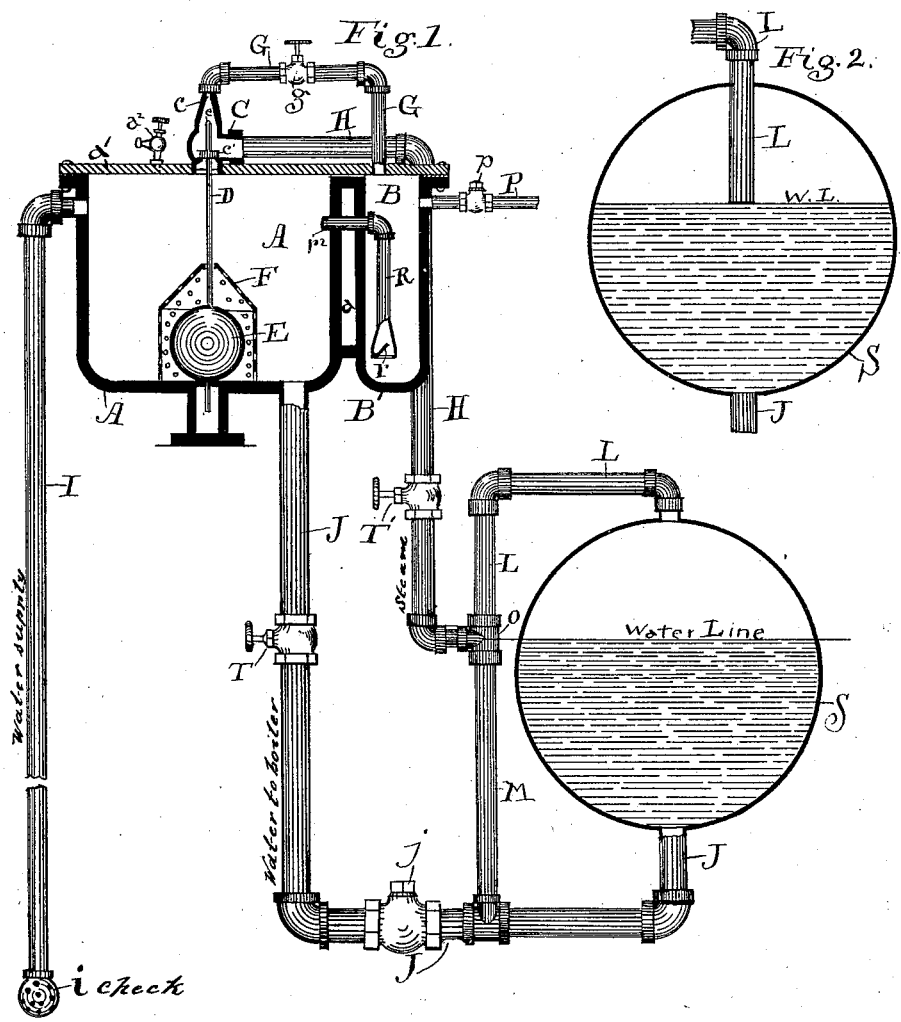
Witnesses:
Chas. E. Daily.
Antoine Dorticos
Inventor:
Fred B. Eastman
by S. N. Bates
his Atty

UNITED STATES PATENT OFFICE.

FRED B. EASTMAN, OF WATERVILLE, ASSIGNOR TO SOLOMON W. BATES AND BENJAMIN F. WRIGHT, OF SAME PLACE, AND WILBUR F. LUNT, OF PORTLAND, MAINE.

WATER-FEEDING DEVICE FOR BOILERS.

SPECIFICATION forming part of Letters Patent No. 364,636, dated June 14, 1887.

Application filed July 23, 1886. Serial No. 208,827. (No model.)

*To all whom it may concern:*

Be it known that I, FRED B. EASTMAN, a citizen of the United States, residing at Waterville, in the county of Kennebec and State of Maine, have invented certain new and useful Improvements in Water-Feeding Devices for Steam-Boilers; and I do hereby declare the following to be a full, clear, and exact description of the invention, such as will enable others skilled in the art to which it appertains to make and use the same.

My invention relates to boiler-feeders; and it is particularly designed to maintain the water of the boiler at a certain specified level.

My invention consists of a steam-trap operated by live steam and adapted to returning hot or cold water into a boiler when the same is under pressure, the trap being so connected with the boiler that when the water-line of the boiler falls below a given point steam is allowed to enter the trap, causing it to discharge water into the boiler, and when the water-line rises above such point, shutting off the steam and stopping the operation of the trap.

My invention further consists in certain improvements in a steam-trap, which I here show to illustrate my invention, the main features of which trap were patented to me May 11, 1886, by Letters Patent numbered 341,737.

The difficulties which I have intended to overcome by the use of my invention are those arising from the intermittent and uncertain manner in which steam-boilers are supplied with water.

The neglect on the part of those having the care of boilers to keep the water-line within proper limits is a constant source of danger to life and property, and the need of an automatic device of this kind, which shall be certain in its action and which shall be constructed with few working parts, is apparent.

My invention is illustrated in the accompanying drawings, in which—

Figure 1 illustrates my trap, showing its connection with a steam-boiler. Fig. 2 shows another manner of making the connection with the boiler.

The trap shown in Fig. 1, and which I here use to illustrate my invention, is the trap patented to me as aforesaid, with certain improvements, which I will hereinafter particularly point out.

A and B are the two closed chambers; $a'$, the cover; C, the double-acting puppet-valve; G, the pipe connecting such valve with the top of chamber B; R, the pipe connecting the bottom of chamber B with chamber A; $r^2$, the spraying device; E, the float; D, the valve-stem; $c'$ and $e$, the two valves; $a^2$, the air-cock; P, the pipe connecting chamber B with cold-water supply, $p$ being check-valve in same.

I is a water-supply pipe connecting chamber A with the source of water-supply, which may be of hot or cold water. This supply may be taken, as here shown, from a lower level than the trap; or it may be taken from the pipes of a water system or from any other source of supply. The pipe I is provided with a foot-valve or check-valve, $i$, which allows water to pass to the trap, but not from it.

J is the outlet-pipe from the bottom of chamber A, and which enters the water-space of the boiler, $j$ being a check-valve.

S is a steam-boiler, here represented as filled with water up to the level which it is desired to maintain.

L is a pipe passing out of the boiler, and M is a pipe connecting with the water-space of the boiler, the two pipes L and M being joined together by the T O, which is placed at or a little above the desired water-level. The pipe H connects the T O with the valve C of the trap.

The operation of my invention is as follows, namely: The water in pipe M stands at the same level as in the boiler proper, and when the water-level of the boiler falls below the T O, steam from the boiler is free to pass through the pipe L, the T O, and the pipe H to the valve C and thence to the trap. The trap may be started by filling the chambers B A with water, the trap being disconnected from the boiler, and then admitting steam through pipe H. The float E in chamber A will be up, opening valve $c'$ and closing valve $e$. The steam will pass into chamber A, forming the same pressure on the top of the water therein contained as in the boiler, and hence allowing the water in chamber A to run by gravity to the boiler. As soon as chamber A is empty, or nearly so, the float E drops and closes the inlet to chamber A, opening the valve e and allowing steam to pass through pipe G to the top of chamber B, expelling the cold water therein contained through the pipe R, and discharging it through the spraying device $r^2$ into chamber A, which is filled with steam. This steam being condensed, a vacuum is formed and water is drafted in through the pipe I, filling chamber A and lifting the float E. When the vacuum is formed, water is also drawn in through the pipe R to chamber A and through pipe P to chamber B, so that as soon as the vacuum is relieved chambers A and B are both full of water. The valve $c'$ being opened by the rising of float E, the steam is admitted to top of chamber A, allowing the water to flow to the boiler, as before described, the valve e at the same time closing and shutting off steam from the top of chamber B. The operation of filling and emptying chamber A is repeated as long as a supply of steam continues to come from the boiler. As soon as a sufficient quantity of water has entered the boiler to raise the level above the opening in the T O, the steam is prevented from passing up the pipe H by the filling of the horizontal opening of T O with water, and the supply of steam being shut off from the trap, it ceases to operate until the water once more falls below the opening in the T O.

The pipe I, as here shown, is connected with a source of supply at a lower level than the trap; but it may be equally well connected with a pipe water system under a head, provided a spring-valve is placed in it to prevent water from entering chamber A against the head of steam. If the pressure of steam was uniform, or comparatively so, and was greater than the pressure of water, such spring-valve would not be necessary. If pipe P is connected with a water-supply under pressure, the same rule holds good as with pipe I—namely, a spring-valve may be essential to prevent water entering against the pressure of steam. The pipe P may be connected with a cold-water supply below the level of the trap, or it may connect directly with pipe I when the latter is connected with a cold-water supply.

It is obvious that the trap must be placed above the water-level of the boiler. The contact of the steam with the surface of the water in chamber A, when the diameter of the chamber is comparatively large, heats the water to a considerable extent, and thus supplies the boiler with warm water. By thus connecting a steam-trap operated by live steam with a boiler, I secure an automatic feeding device which keeps the level of the water in the boiler at or very near the same point. It is desirable to place the T O somewhat above the point where it is ordinarily desired to keep the water-level.

The efficiency of the trap depends largely upon the size of its outlet and the height at which it sets above the boiler, because, while it requires but a few seconds to condense the steam and draw in the water, the greater part of the time is taken up in discharging the water through the outlet-pipe, through which it runs by gravity. I can accomplish the same result as here shown by the use of any well-known steam-trap which is operated by live steam from the boiler, so that I do not wish to confine myself to the trap here shown as applied to this purpose.

In Fig. 2 I show an alternate manner of connecting the trap and the boiler. In this figure the pipe L is shown open at its lower end on the level at which it is desired to maintain the water. When the water falls below this opening the steam passes to the trap, as before described.

The parts of the steam-trap which I have described are substantially identical with similar features in the trap patented to me, as aforesaid, with the exception of the manner of combining chambers A and B, which in my trap, as already patented, I made as parts of a steam-tight reservoir, the two chambers being separated simply by a partition. It was found on trial that the trap as thus constructed would not run continuously, but after running awhile would stop. I remedied this difficulty by separating or insulating the cylinders so that they would not come in contact, and as now constructed the trap will run for any length of time while it is supplied with steam. This insulation or separation may be effected by casting the two parts of the trap with an air-space between them, or by making them as two independent cylinders, or by interposing between the two chambers some non-conducting substance.

F shows a hood or covering made to protect the float E from the downward rushing of the steam as it entered the top of chamber A. It was found that when the valve $c'$ opened the steam rushing in would rush downward through the water, and, striking the float E, cause it to drop before the water was all discharged from chamber A. I protect it from the action of the steam by a hood, F; but any device which will deflect the steam as it comes in at top of chamber A will accomplish the same purpose.

I am aware that it is not new to control the supply of steam to a trap by the height of water in the boiler, and I do not claim such, broadly.

I am aware that a self-acting boiler-feeder has been used wherein water was drawn from a lower level by the condensation of steam in a steam-trap having two chambers, said trap being connected by a steam-supply pipe with the boiler in such a manner that the rising and falling of the water in the boiler shut off and operated said trap, but such device is much more complicated than mine and contained nothing analogous to my double-acting valve operated by a float.

I claim—

1. In an automatic boiler-feeder for supplying steam-boilers with water, a steam-trap adapted to be operated by live steam and to return water into a boiler under pressure, a discharge-pipe from said trap into said boiler, and a steam-supply pipe connecting the steam-space of said boiler with said trap and forming outside of said boiler a bend or turn, the lower portion of which is substantially at the level required of the water in the boiler, said bend connecting by a pipe with the water-space of the boiler, substantially as shown.

2. In an automatic boiler-feeder for supplying steam-boilers with water, a steam-trap adapted to be operated by live steam and to return water into a boiler under pressure, a discharge-pipe from said trap into said boiler, and a steam-supply pipe connecting the steam-space of said boiler with said trap, said supply-pipe having a substantially horizontal portion connected with the water-space of the boiler and being at the mean water-level desired, whereby the water of said boiler rising and falling in said horizontal pipe shuts off and opens said steam-supply pipe, substantially as described.

3. In a device for supplying steam-boilers with water, the combination of a steam-boiler with a steam-trap having a chamber or cylinder provided with an inlet-pipe from a source of water-supply, an outlet-pipe connecting with water-space of said boiler, a smaller cylinder provided with a cold-water-supply pipe, a pipe leading from the lower part of said smaller cylinder to the larger cylinder, valve mechanism operated by a float, whereby steam is alternately admitted and shut off from the two chambers, and a steam-supply pipe connecting said valve mechanism with said boiler in such a manner that the rising and falling of the water of said boiler above or below a given level shuts off and opens said steam-supply pipe, substantially as shown.

In testimony whereof I affix my signature in presence of two witnesses.

FRED B. EASTMAN.

Witnesses:
 LUKE B. SPENCER,
 H. D. BATES.